(12) United States Patent
Matsumoto et al.

(10) Patent No.: US 10,781,305 B2
(45) Date of Patent: Sep. 22, 2020

(54) RESIN COMPOSITION AND MEMBRANE STRUCTURE COMPRISING THE SAME

(71) Applicant: DENKA COMPANY LIMITED, Tokyo (JP)

(72) Inventors: Mutsumi Matsumoto, Gunma (JP); Tadashi Sawasato, Chiba (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 16/324,003

(22) PCT Filed: Oct. 4, 2017

(86) PCT No.: PCT/JP2017/036078
§ 371 (c)(1),
(2) Date: Feb. 7, 2019

(87) PCT Pub. No.: WO2018/066584
PCT Pub. Date: Apr. 12, 2018

(65) Prior Publication Data
US 2019/0177526 A1 Jun. 13, 2019

(30) Foreign Application Priority Data
Oct. 5, 2016 (JP) .................................. 2016-197140

(51) Int. Cl.
| | | |
|---|---|---|
| *C08L 27/12* | (2006.01) | |
| *C08K 5/13* | (2006.01) | |
| *C08K 5/5393* | (2006.01) | |
| *C08K 5/523* | (2006.01) | |
| *C08K 5/1575* | (2006.01) | |
| *C08K 5/526* | (2006.01) | |
| *C09D 127/12* | (2006.01) | |
| *C08K 5/527* | (2006.01) | |
| *C08L 23/08* | (2006.01) | |
| *C08F 214/24* | (2006.01) | |

(52) U.S. Cl.
CPC .............. *C08L 27/12* (2013.01); *C08K 5/13* (2013.01); *C08K 5/1575* (2013.01); *C08K 5/523* (2013.01); *C08K 5/526* (2013.01); *C08K 5/527* (2013.01); *C08K 5/5393* (2013.01); *C09D 127/12* (2013.01); *C08F 214/245* (2013.01); *C08L 23/0892* (2013.01); *C08L 2201/10* (2013.01); *C08L 2203/16* (2013.01); *C08L 2203/206* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,745,145 A | * | 7/1973 | Khattab et al. | .......... C08K 5/00 524/128 |
| 3,947,525 A | | 3/1976 | Robertson et al. | |
| 4,070,341 A | | 1/1978 | Schulze | |
| 4,225,379 A | * | 9/1980 | Ishii | ....................... B29C 63/02 216/35 |
| 4,496,677 A | | 1/1985 | Briggs, Jr. et al. | |
| 4,539,354 A | | 9/1985 | Chung et al. | |
| 5,051,460 A | * | 9/1991 | Kirsch | ..................... C08K 5/10 524/114 |
| 5,328,948 A | * | 7/1994 | Chen | ..................... C08K 5/005 524/101 |
| 5,962,610 A | | 10/1999 | Abusleme et al. | |
| 2001/0027236 A1 | | 10/2001 | Abusleme et al. | |
| 2011/0120937 A1 | * | 5/2011 | Ishizuka | ............. B01D 63/061 210/493.1 |
| 2013/0202878 A1 | | 8/2013 | Carella et al. | |
| 2016/0102199 A1 | | 4/2016 | Carella et al. | |

FOREIGN PATENT DOCUMENTS

| | | | | | |
|---|---|---|---|---|---|
| CN | 104559523 A | * | 4/2015 | | |
| CN | 107097469 A | * | 8/2017 | | |
| EP | 0367579 A2 | | 5/1990 | | |
| EP | 0 683 204 A2 | | 11/1995 | | |
| EP | 1236503 A1 | * | 9/2002 | .......... B01D 67/003 | |
| GB | 1353848 A | | 5/1974 | | |
| JP | S47-033137 A | | 11/1972 | | |
| JP | S53-074552 A | | 7/1978 | | |
| JP | S60-188447 A | | 9/1985 | | |
| JP | H07-316375 A | | 12/1995 | | |
| JP | H10-077318 A | | 3/1998 | | |
| JP | 2001-270969 A | | 10/2001 | | |
| JP | 2004-031445 A | | 1/2004 | | |
| JP | 2013-543027 A | | 11/2013 | | |
| JP | 2016-518512 A | | 6/2016 | | |

OTHER PUBLICATIONS

Machine translation of CN 107097469, retrieved Jan. 2020. (Year: 2020).*
Abstract of CN 104559523 A, 2015 (Year: 2015).*
Europe Patent Office, "Search Report for European Patent Application No. 17858421.5," dated Sep. 18, 2019.
PCT/ISA/210, "International Search Report for International Application No. PCT/JP2017/036078," dated Nov. 28, 2017.

* cited by examiner

*Primary Examiner* — Nicole M. Buie-Hatcher
(74) *Attorney, Agent, or Firm* — Manabu Kanesaka

(57) ABSTRACT

Provided is an ECTFE resin composition that is superior in transparency and resistant to yellowing for an extended period of time. The ECTFE resin composition generates a smaller amount of acidic gases, for example, when it is extrusion molded at high temperature. It is an ethylene-chlorotrifluoroethylene copolymer resin composition including a bisphenol-based antioxidant. It is preferably an ethylene-chlorotrifluoroethylene copolymer resin composition additionally including a phosphorus-based antioxidant.

20 Claims, No Drawings

RESIN COMPOSITION AND MEMBRANE STRUCTURE COMPRISING THE SAME

RELATED APPLICATIONS

The present application is National Phase of International Application No. PCT/JP2017/036078 filed Oct. 4, 2017, and claims priority from Japanese Application No. 2016-197140, filed Oct. 5, 2016, the disclosure of which is hereby incorporated by reference herein in its entirety.

TECHNICAL FIELD

The present invention relates to a resin composition and a membrane structure comprising the same. More specifically, it relates to an ethylene-chlorotrifluoroethylene copolymer resin composition and a membrane structure comprising the same.

BACKGROUND ART

Ethylene-chlorotrifluoroethylene copolymers (hereinafter, referred to as "ECTFEs"), which are superior in weather resistance, chemical resistance, staining resistance, water repellency, insulating performance, low frictional properties, and electrical insulating properties and also in low hygroscopicity, steam barrier properties, low chemical permeability, flame resistance, and flame spread resistance, have been used, for example, as structural parts of semiconductor-producing machines and various corrosion-resistant linings. As ECTFEs permit film forming, they have been used widely in various applications including surface protection films, member films for solar cells, release films, and films for membrane structures.

For example, Patent Document 1 discloses a polymer composition containing ECTFE as its base ingredient and describes that the polymer composition is used for production of films for use in food industry and pharmaceutical industry.

Alternatively, Patent Document 2 discloses a thermoplastic fluoropolymer composition containing a semicrystalline polymer having recurring units derived from ethylene, chlorotrifluoroethylene, and the like and particles of an inorganic UV-screening agent compound. In addition, Patent Document 2 describes that the thermoplastic fluoropolymer composition is used in the shape of film, for example, as films for construction.

Further, Patent Document 3 discloses an ECTFE-type ethylene and fluorine-containing copolymer and describes that the copolymer has excellent mechanical properties and can be used in production of sheets and others.

Further, Patent Document 4 discloses an ECTFE resin composition and describes that the composition is suited for production of sheets and others.

As described above, ECTFEs are used often as they are molded, for example, into sheets and thus demanded favorable transparency. In addition, ECTFEs have a problem that they easily generate acidic gases under the high temperature condition for extrusion molding thereof into sheets and others and thus, various stabilizers such as antioxidants have been added thereto.

CITATION LIST

Patent Document

Patent Document 1: JP-A No. 2001-270969
Patent Document 2: JP-T No. 2013-543027
Patent Document 3: JP-A No. H10-77318
Patent Document 4: JP-A No. S60-188447

SUMMARY OF THE INVENTION

Technical Problem

However, the antioxidants described above had a problem that they are less compatible with fluorine resins such as ECTFEs and addition thereof often results in deterioration in transparency.

They also had a problem that they gradually yellow and degrade over time even if they are superior in transparency during sheet formation.

It is thus desired to add an antioxidant resistant to yellowing over time to ECTFEs. It is also more desirable if it is possible to suppress the amount of acidic gases generated from ECTFEs during sheet formation at high temperature.

Accordingly, a main object of the present invention is to provide an ECTFE resin composition that can retain its favorable transparency and is resistant to yellowing. Another object of the present invention is to reduce the amount of acidic gases generated from the ECTFE resin composition, for example, during extrusion molding at high temperature.

Solution to Problem

The present invention provides an ECTFE resin composition comprising a bisphenol-based antioxidant.

The bisphenol-based antioxidant may be added in an amount in the range of 0.01 to 1.0 mass %.

The bisphenol-based antioxidant is preferably an alkyl-substituted bisphenol-based antioxidant.

The bisphenol-based antioxidant is preferably one or more compounds selected from 3,9-bis[2-[3-(tert-butyl-4-hydroxy-5-methylphenyl)propionyloxy)]-1,1-dimethylethyl]-2,4,8,10-tetraoxaspiro[5,5]undecane, 4,4'-butylidene bis(3-methyl-6-tert-butylphenol) and 2,2'-bis(4-hydroxyphenyl)propane.

The ECTFE resin composition according to the present invention may comprise additionally a phosphorus-based antioxidant.

The phosphorus-based antioxidant is preferably contained in an amount in the range of 0.01 to 1.0 mass %.

The phosphorus-based antioxidant is preferably a phosphorous ester-based antioxidant.

Further, the phosphorus-based antioxidant is preferably one or more compounds selected from 6-[3-(3-tert-butyl-4-hydroxy-5-methylphenyl)propoxy]-2,4,8,10-tetra-t-butyldibenzo[d,f] [1,3,2]dioxaphosphepin, 3,9-bis(2,6-di-tert-butyl-4-methylphenoxy)-2,4,8,10-tetraoxa-3,9-diphosphaspiro[5,5]undecane, and tris(2,4-di-tert-butylphenyl) phosphite.

Further, the ECTFE according to the present invention preferably contains no acid acceptor.

The present invention also provides a sheet-shaped ECTFE resin composition and a membrane structure comprising the ECTFE resin composition.

It also provides a building employing an ECTFE resin composition as the roofing material, outer wall material, or coating material, a front or back sheet for solar cells employing an ECTFE resin composition, and an agricultural film employing an ECTFE resin composition.

Advantageous Effects of Invention

The present invention provides an ECTFE resin composition superior in transparency and resistant to yellowing. It also provides an ECTFE resin composition that generates a smaller amount of acidic gases under high temperature condition during molding.

DESCRIPTION OF EMBODIMENTS

Hereinafter, the present invention will be described in detail, but it should be understood that the present invention shall not be limited to the embodiments described below.
<ECTFE Resin Composition>

ECTFE is a copolymer of ethylene (hereinafter, referred to as "Et") and chlorotrifluoroethylene (also called "ethylene trifluoride chloride", hereinafter, referred to as "CTFE").

In the present invention, the ECTFE resin composition is not limited to copolymers of Et monomer and CTFE monomer. Copolymers of Et monomer, CTFE monomer and additionally a third monomer such as (perfluorohexyl)ethylene, (perfluorobutyl)ethylene, (perfluorooctyl)ethylene, or [4-(heptafluoroisopropyl)perfluorobutyl] ethylene are also included.

The monomer ratio (molar ratio) of Et and CTFE in the copolymerization is not particularly limited, and Et/CTFE is preferably 30/70 to 70/30, more preferably 40/60 to 60/40. When the Et monomer rate is 70 or less, as the CTFE monomer rate is relatively not too low, it is possible to make the characteristics of fluoroplastics, such as transparency, weather resistance, and stainproofness, less impaired. In addition when the CTFE monomer rate is 70 or less, it is possible to prevent excessive increase in the amount of acidic gases generated during use at high temperature.

The ECTFE, as used in the present invention, may be a single ECTFE at an arbitrary Et/CTFE ratio or a mixture of two or more ECTFEs having different Et/CTFE ratios.

Further, a resin other than ECTFE may be added, as needed, in the range that does not impair the transparency of the ECTFE resin composition according to the present invention. Examples of the resins other than ECTFE include terpolymers of ethylene, chlorotrifluoroethylene and another third monomer, polychlorotrifluoroethylene (PCTFE), ethylene-tetrafluoroethylene copolymers (ETFEs), polyvinyl fluoride (PVF), polyvinylidene fluoride (PVDF), vinylidene fluoride-hexafluoropropylene copolymers, polytetrafluoroethylene (PTFE), polyhexafluoropropylene (HFP), polyperfluoroalkylvinylethers (PFAs), terpolymers of vinylidene fluoride, tetrafluoroethylene, vinylidene fluoride, and hexafluoropropylene.

The ECTFE resin composition according to the present invention contains a bisphenol-based antioxidant.

The bisphenol-based antioxidant is not particularly limited in the present invention and it is preferably, for example, an alkyl-substituted bisphenol-based antioxidant. Particularly preferable among such antioxidants are 3,9-bis[2-[3-(tert-butyl-4-hydroxy-5-methylphenyl)propionyloxy)]-1,1-dimethylethyl]-2,4,8,10-tetraoxaspiro[5,5]undecane, 4,4'-butylidene bis(3-methyl-6-tert-butylphenol), 2,2'-bis(4-hydroxyphenyl)propane, and the like. It is possible, by addition of such a bisphenol-based antioxidant to ECTFE, to make it show both high heat resistance and favorable compatibility with ECTFE.

The bisphenol-based antioxidants may be used alone or in combination of two or more.

The bisphenol-based antioxidant for use in the present invention has a melting point preferably of 100° C. or higher, more preferably of 150° C. or higher. When the melting point is 100° C. or higher, it is possible to eliminate the concerns on the bisphenol-based antioxidant bleeding out onto the sheet surface during casting and also on discoloration of the bisphenol-based antioxidant by decomposition.

As for the method of adding the bisphenol-based antioxidant to the ECTFE resin composition, the bisphenol-based antioxidant may be added previously in the step of granulating ECTFE raw materials or may be added in the step of producing a sheet of the ECTFE resin composition with unadded ECTFE raw materials, as they are melt-mixed.

The amount of the bisphenol-based antioxidant added to the ECTFE resin composition is not particularly limited in the present invention, but is preferably 0.01 to 1.0 mass %, more preferably 0.01 to 0.5 mass %. When the addition amount is 1.0 mass % or less, it is possible to prevent yellowing and also deterioration in transparency of the ECTFE resin composition. When it is 0.01 mass % or more, a sufficiently high acidic gas-reducing effect is obtained.

The ECTFE resin composition according to the present invention may contain additionally a phosphorus-based antioxidant. As the bisphenol-based antioxidant and the phosphorus-based antioxidant have different in resin oxidation-preventing mechanisms, combined used thereof is more preferable from the viewpoint for reduction of the amount of acidic gases generated.

The phosphorus-based antioxidant is not particularly limited in the present invention and examples thereof include those having a trivalent organic phosphorus skeleton in the molecular structure. Although there are antioxidants having both a trivalent organic phosphorus skeleton and a phenol skeleton in the molecular structure, these antioxidants are also classified, for convenience, in phosphorus-based antioxidants.

The number of such skeletons in the phosphorus-based antioxidant for use in the present invention is not particularly limited.

The phosphorus-based antioxidant is, for example, a phosphorous ester-based antioxidant. Particularly preferable among them are 3,9-bis(2,6-di-tert-butyl-4-methylphenoxy)-2,4,8,10-tetraoxa-3,9-diphosphaspiro[5.5]undecane, 6-[3-(3-tert-butyl-4-hydroxy-5-methylphenyl)propoxy]-2,4,8,10-tetra-t-butyldibenzo[d,f][1,3,2]dioxaphosphepin, tris(2,4-di-tert-butylphenyl) phosphite, 3,9-bis(octadecyloxy)-2,4,8,10-tetraoxa-3,9-diphosphaspiro[5,5]undecane, tris(4-nonylphenyl) phosphite, diphenyl (2-ethylhexyl) phosphite, diphenyl isodecyl phosphite, and the like. The phosphorus-based antioxidants may be used alone or in combination of two or more.

In particular, 3,9-bis(2,6-di-tert-butyl-4-methylphenoxy)-2,4,8,10-tetraoxa-3,9-diphosphaspiro[5.5]undecane, when used, is effective in reducing the amount of the acidic gases generated and gives a resin composition superior in high transparency, heat resistance of antioxidant, weather resistance, and yellowing resistance.

In particular, 6-[3-(3-tert-butyl-4-hydroxy-5-methylphenyl)propoxy]-2,4,8,10-tetra-t-butyldibenzo[d,f][1,3,2]dioxaphosphepin, when used, gives a resin composition superior in yellowing resistance and also is effective in reducing the amount of acidic gases generated and high transparency.

The phosphorus-based antioxidant for use in the present invention has a melting point preferably of 100° C. or higher, more preferably of 150° C. or higher. When the phosphorus-based antioxidant has a melting point of 100° C. or higher, it is possible to eliminate the concerns on the phosphorus-based antioxidant bleeding out onto the sheet surface during casting and also on discoloration of the phosphorus-based antioxidant by decomposition.

As for the method of adding the phosphorus-based antioxidant to the ECTFE resin composition, it may be added previously in the step of granulating ECTFE raw materials or may be added in the step of producing a sheet of the ECTFE resin composition with unadded ECTFE raw materials, as they are melt-mixed.

The addition amount of the phosphorus-based antioxidant for use in the present invention is not particularly limited in the present invention, but preferably 0.01 to 1.0 mass %, more preferably 0.01 to 0.5 mass %. When it is 1.0 mass % or less, it is possible to suppress yellowing of the ECTFE resin composition and prevent excessive reduction in transparency. When it is 0.01 mass % or more, a sufficiently high acidic gas-reducing effect is obtained.

The ECTFE resin composition according to the present invention may contain, as needed, a known heat stabilizer, a stabilization assistant, and the like. Examples of the heat stabilizers include organic sulfur-based antioxidants, amine-based antioxidants, hydroxyamine, organic tin compounds, and ß-diketones.

The heat stabilizers may be used alone or in combination of two or more.

In adding the heat stabilizer, the stabilization assistant, and others to the ECTFE resin composition, they may be added previously in the step of granulating the ECTFE raw materials or in the step of producing the sheet of the ECTFE resin composition, with other unadded ECTFE raw materials, as they are melt-mixed.

The addition amounts of the heat stabilizer and the stabilization assistant may be 0.01 to 1.0 mass % as the total amount. When the addition amount is 1.0 mass % or less, it is possible to prevent excessive deterioration in transparency of the ECTFE resin composition. When it is 0.01 mass % or more, it is possible to obtain sufficiently high acidic gas-reducing effect.

Plasticizers, lubricants, antistatic agents, anti-fogging agents, dripping agents, hydrophilizing agents, liquid repellent agents, and the like may be added to the ECTFE resin composition according to the present invention in the range that does not practically impair the transparency, color tone, glossiness, heat resistance, weather resistance, yellowing resistance, sheet appearance, and other. In adding these additives, they may be added when the resin composition is kneaded or coated on the surface of the sheet of the ECTFE resin composition after it is prepared.

In addition, pigments may be added, as needed, to the ECTFE resin composition according to the present invention in the range that does not impair its yellowing resistance and transparency. Examples of the favorable pigments include, but are not limited to, metal oxides such as titanium oxide and zinc oxide, metal carbonate salts such as calcium carbonate, silica, carbon black, acetylene black, chrome yellow, phthalocyanine blue, and phthalocyanine green.

The ECTFE resin composition according to the present invention preferably contains no acid acceptor such as metal soap. If it contains an acid acceptor, although it is possible to suppress generation of acidic gases distinctively when the ECTFE resin composition is extrusion-molded under a high-temperature condition, it may also lead to deterioration in weather resistance and image visibility of the ECTFE resin composition.

<Sheet-Producing Method>

It is possible to mold the ECTFE resin composition according to the present invention into various shapes. Hereinafter, sheet-producing method will be described.

Any known method may be used for production of a sheet and it is possible to produce a sheet, for example, by a melt extrusion method of using an extruder and a T die such as feed block die or multi-manifold die. Single-screw, twin-screw, and tandem extruders are generally used as the extruders, but, for prevention of resin detention in the extruder system, a single-screw type extruder is preferable.

The shape of the screw used in the single screw extruder is not particularly limited, if it has a configuration that is not accompanied with excessive shear heating, but a full flight screw is more preferable for melt extrusion without application of excessive shearing.

The compression ratio of the screw is preferably in the range of 1.8 to 3.0, more preferably in the range of 2.1 to 2.7. When it is less than 1.8, the ECTFE resin is not sufficiently plasticized and part of the resin is captured by the screen mesh, as it is not melted, causing clogging and increase of resin pressure and thus, the resulting sheet may be contaminated with the unmelted resin as defects. When it is more than 3.0, acidic gases may be generated in an excessive amount by the excessive shearing heat generated.

The ratio (L/D) of screw length (L) to screw (barrel) diameter of the extruder is not particularly limited, if the extruder has an L/D necessary and sufficient for plasticization of ECTFE, but it is preferably 20 to 40, more preferably 25 to 35. When the ratio L/D is less than 20, the resin may not be plasticized sufficiently in the screw region, generating unmelted products and causing contamination thereof in the resulting sheet as defects. When the L/D is more than 40, the screw easily gives excessive shearing, possibly leading to increase in the amount of the acidic gases generated.

The extruder has a breaker plate between the tip of the screw and the T die. The open area rate of the breaker plate is preferably 40 to 60%, more preferably 42 to 58%. When the open area rate of the breaker plate is 40% or more, it is possible to reduce the back pressure to the resin and suppress resin detention in the extruder. When the open area rate is 60% or less, it is possible to keep the number of defects in the sheet low consistently for an extended period of time.

The open area rate represents the rate of the region where the resin-passing holes are formed with respect to the entire region exposed to the passing resin in the extruder including the region of the resin-passing holes.

The diameter of the resin-passing holes in the breaker plate is preferably 3.7 to 7.0 mm. When the resin-passing hole has a diameter of 3.7 mm or more, it is possible to reduce the back pressure to the resin and suppress resin detention in the extruder. When the diameter is 7.0 mm or less, it becomes possible to keep the number of defects in the sheet low consistently for an extended period of time.

Two or more screen meshes different in the size of openings are preferably used as the screen mesh placed on the breaker plate. Screen meshes having the same opening size may be used in combination as the screen mesh. A large-opening screen mesh and a small-opening screen mesh are preferably installed in that order generally in the direction from upstream of the resin passing area (closer to screw) to downstream thereof (closer to breaker plate openings). Further, downstream of the smallest-opening mesh, a mesh rougher than the mesh is preferably installed for prevention of destruction of the mesh by resin pressure. In production of a sheet of the ECTFE resin composition according to the present invention, the minimum size of the opening of the screen mesh is preferably 0.03 to 0.2 mm, more preferably 0.03 to 0.15 mm. When the minimum size of the opening of the screen mesh is 0.03 mm or more, it is possible to suppress degradation by the shear heat generation of the resin. Alternatively when the minimum size of the opening of the screen mesh is 0.2 mm or less, it is possible to reduce the amount of contaminant in the resin and degradation products of the raw materials.

A screen mesh having larger openings has a role to remove coarse defects and the size of the opening is preferably 0.15 to 0.6 mm. Further for prevention of destruction of the screen mesh by resin pressure, a larger-opening coarse screen mesh may be installed downstream of the minimum-opening screen mesh. As for the position of the screen mesh installed, it is preferably installed 10 to 100 mm downstream of the tip region of the screw.

The shape of the channel in the T die used in sheet production is not particularly limited if it has a specification resistant to resin detention and an example of the T die that can be used favorably is a coat hanger die. There are mainly two types of T die systems different in resin discharge direction: those discharging resin in the horizontal direction and those discharging resin downward in the direction perpendicular to the horizontal direction. Both types of systems can be used favorably.

The temperature setting of the extruder for sheet production may vary according to the kind and flowability of the ECTFE raw material, but the temperature is preferably 220 to 300° C., more preferably 230 to 290° C., in the downstream region of the extruder. When the temperature is lower than 220° C., it may be difficult to plasticize the resin sufficiently and, when it is higher than 300° C., there may be excessive increase in the amount of acidic gases generated by excessive heating.

The sheet thus extruded out of the T die becomes immediately in contact with a chill roll installed close to the die and withdrawn, as it is cooled. As the ECTFE is a crystalline resin, it is preferable for expression of superior transparency to chill the sheet rapidly with a chill roll before crystallization of the resin out of the molten state proceeds. The distance, i.e., the smallest distance, between the outlet of T die and the position where the sheet becomes in contact with the chill roll is preferably 150 mm or less, more preferably 100 mm or less. When it is more than 200 mm, crystallization proceeds excessively, leading to deterioration in transparency of the sheet.

The method of chilling the sheet with a chill roll may be a method of cooling a sheet-shaped melt resin by supplying it into the slit between two hard-surfaced rolls, such as those hard-chrome plated, that has a thickness giving desired sheet thickness or cooling a sheet-shaped melt resin by supplying it into a space between the hard-surfaced roll and a rubber-covered roll for example of silicone rubber that is pushed thereon under pressure and thus forcing it in contact with the roll.

The roll material used for production of the resin sheet according to the present invention is not particularly limited, but preferably has a maximum height roughness (Ry), an indicator of surface roughness, of 1 s or less, and more preferably less than 0.3 s. If Ry is more than 1 s, when the sheet-shaped melt resin is made in contact with a chill roll, the irregularities on the roll may become easily transferred onto the surface of the sheet, resulting in increase in external haze.

The temperature of the chill roll described above is preferably 20° C. to 150° C., more preferably 50° C. to 120° C. When it is lower than 20° C., dewing may occur easily on the surface of the roll, possibly increasing the risk of deteriorating sheet appearance and the roll also causes decrease of the temperature of the ambient atmosphere, making it difficult to obtain favorable transparency. When it is higher than 150° C., the sheet may not be cooled sufficiently, possibly leading to adhesion thereof to the roll.

The sheet thus withdrawn as described above is guided with suitable guide rolls in the range that does not damage the sheet surface, slit to a desired sheet width and wound around a cardboard tube, as it is cooled sufficiently. The material of the cardboard tube is not particularly limited, but it is preferable to use a cardboard tube with a diameter so large that the sheet show almost no winding curl when used after storage of the roll.

The thickness of the sheet is not particularly limited, but preferably 0.005 to 1.0 mm, more preferably 0.01 to 0.5 mm. When the thickness is smaller than 0.005 mm, the sheet may become vulnerable, possibly prohibiting practical use. When the thickness is larger than 1.0 mm, the transparency of the sheet may decline excessively.

The "sheet," as used in the present specification, include those generally called "film," and there is no distinct difference between "sheet" and "film," sheet only having a larger thickness and film having a smaller thickness.

The width of the sheet is not particularly limited, but normally a range of 300 mm to 3000 mm is preferable from the point of handling.

<ECTFE Resin Composition Sheet>

A resin sheet mainly containing the ECTFE resin composition shows, for example, the following physical properties:

a heat of crystal fusion of less than 30 J/g, as determined in differential scanning calorimetric analysis in the heating process from 23° C. to 300° C. at a heating rate of 10° C./min a haze value of less than 10, as determined according to JIS K7105 a glossiness of 100 or more, as determined according to JIS K7374 at an incident angle of 60°

When the heat of crystal fusion is less than 30 J/g, it is possible to suppress deterioration in transparency, as the sheet has increased crystallinity.

The haze value of the sheet, as determined according to JIS K7105 by using a hazemeter, is preferably less than 10%, more preferably less than 5%. A haze value of 10% or more may result in deterioration in image visibility and light-collecting efficiency that are desired in applications demanding high transparency such as membrane structures and front sheets of solar cells.

The glossiness, as determined according to JIS K7374 by using a gross meter at an light incident angle of 60°, is preferably 100 or more, more preferably 120 or more. When the glossiness is smaller than 100, such a sheet may be unfavorable for applications demanding superior image visibility including membrane structures.

The ECTFE resin composition sheet according to the present invention contains a bisphenol-based antioxidant having a melting point of 100° C. or higher in an amount of 0.01 to 1.0 mass % with respect to 100 mass % of the resin sheet. The bisphenol-based antioxidant is, for example, 3,9-bis[2-[3-(tert-butyl-4-hydroxy-5-methylphenyl)propionyloxy)]-1,1-dimethylethyl]-2,4,8,10-tetraoxaspiro[5,5]undecane.

In addition, the sheet contains a phosphorus-based antioxidant having a melting point of 100° C. or higher in an amount of 0.01 to 1.0 mass % with respect to 100 mass % of the resin sheet. The phosphorus-based antioxidant is, for example, 6-[3-(3-tert-butyl-4-hydroxy-5-methylphenyl)propoxy]-2,4,8,10-tetra-t-butyldibenzo[d,f][1,3,2]dioxaphosphepin.

The ECTFE resin composition sheet can be used favorably in applications demanding superior visible light permeability and image visibility. In particular, it can be used in membrane structures using a sheet as the roofing material, outer wall material, coating material or the like of buildings. The sheet may be used as the sheet of membrane structure, as it is or as it is laminated with other materials. The laminated sheet may also be converted into various shapes, as part of the laminated sheets are bonded to each other and air is introduced for inflation into the region where the laminated sheets are not bonded.

If the ECTFE resin composition sheet is used, as it is, in a membrane structure, weather resistance withstanding outdoor exposure for an extended period of time is demanded.

For example in examining the weather resistance, the sheet is subjected to an accelerated aging test under UV irradiation, using a ultraviolet light having a wavelength of 300 to 400 nm and an intensity of 123 mW/cm$^2$, in which a cycle of (i) ultraviolet light irradiation for 8 hours under a condition of a temperature of 63° C. and a relative humidity of 50% RH, (ii) showering for 20 seconds, (iii) dewing for 2 hours, and (iv) showering for 20 seconds is repeated for 200 hours. Although the test method is not limited thereto, it is preferably a test that reflects the fact that it is used outdoors for an extended period of time.

As for the weather resistance of the ECTFE resin composition sheet according to the present invention, the change in haze after the accelerated aging test under UV irradiation is preferably less than 10%, more preferably less than 5%.

In addition, the ECTFE resin composition sheet preferably has a yellowing index (YI), as determined according to JIS K7373 using a colorimeter, of less than 4.0, more preferably less than 2.0, after the accelerated aging test under UV irradiation. It is possible when the YI is 4.0 or more to observe yellowing of the sheet itself macroscopically and the yellowing may result in deterioration in image visibility of the sheet when it is used as a sheet for membrane structure.

Further, the image visibility of the ECTFE resin composition sheet can be evaluated, for example, based on the sharpness of an image placed in the far side of the sheet. An exemplary indicator of the image visibility favorable in using the sheet as the sheet of membrane structure is whether the outline and the tint of an observation image, which is placed 1 m separated in the opposite side of the sheet, can be recognized visually without blurring.

Further, the acidic gas generation-reducing efficiency when the ECTFE resin composition sheet is produced at high temperature, for example by extrusion molding can be evaluated by using an apparatus that measures acidic gas concentration at an arbitrary position. The apparatus is not particularly limited, if it has a sufficient quantitative accuracy. An analytical apparatus that may be used is, for example, an acidic gas concentration-detecting device containing an acidic gas absorbent filled in a glass tube, which permits quantitative recovery of gas and determination of the gas concentration.

Specifically, the acidic gas concentration is determined by measuring the total concentration of acidic gases at a position separated by a straight line distance of 100 mm from the lip of the T die used for production of the ECTFE resin composition sheet. The acidic gas concentration is preferably less than 15 ppm, more preferably less than 10 ppm. When the acidic gas concentration is more than 15 ppm, there may be easier corrosion in steel products in the surrounding facilities including dies, possibly prohibiting consistent production of the sheet for an extended period of time.

<Membrane Structures>

The sheet prepared by molding the ECTFE resin composition according to the present invention, which shows high transparency, weather resistance, and flame resistance and is superior in image visibility, can be used favorably in membrane structures.

Examples of the membrane structures include roofing materials, outer wall materials, and coating materials for sport facilities such as pools, athletic stadiums, soccer stadiums, baseball stadiums, and gymnasiums, automobiles, ships, airports, stations, highways, pavements, bus terminals, bus and taxi stands, carports, warehouses, assembly halls, exhibition halls, aquiculture facilities, and horticulture facilities.

The sheet prepared by molding the ECTFE resin composition may be additionally processed, for example printed, in the range that does not impair the transparency, color tone, glossiness, heat resistance, weather resistance, yellowing resistance, and sheet appearance of the sheet. The printing method is, for example, a method of printing, on the surface of the ECTFE resin composition sheet having a printing face previously corona or plasma treated, by a properly-selected printing method compatible with the purpose and application, such as gravure printing, flexographic printing, or offset printing.

It is possible by the printing to provide the sheet or the membrane structure with favorable appearance and others.

<Solar Cell Application>

The sheet prepared by molding the ECTFE resin composition according to the present invention, which has high transparency, high weather resistance as well as high flame resistance, can be used favorably as a solar cell part, specifically as the front sheet or back sheet of solar cells. The sheet can be applied, for example, to the front sheets and back sheets described in JP-A Nos. 2013-145807, 2012-254529, and 2000-294813. In particular when the sheet is applied to an amorphous silicon-based, compound-based or other thin film-based solar cell as a front sheet replacing conventional glass sheet, it provides a solar cell superior both in weather resistance and softness.

<Agricultural Film>

As the sheet prepared by molding the ECTFE resin composition according to the present invention is not only superior in high transparency, weather resistance, and flame resistance, but also in in softness, which allows application generally to horticulture facilities including agricultural large-scale green houses and pipe houses, and in durability against natural disasters, it is also considered to be useful as an agricultural film. Specifically, the sheet according to the present invention is useful as the agricultural films described in JP-A Nos. 11-335422 and 11-343316, WO 2010/092990 pamphlet and JP-T No. 2013-523490.

EXAMPLES

Hereinafter, the present invention will be described more in detail with reference to Examples, but it should be understood that the present invention shall not be restricted at all by these Examples.

<Raw Materials>

Raw materials used in the Examples and Comparative Examples below are shown below.

(ECTFE)

"Halar ECTFE 700HC," manufactured by Solvay
melting point: 202° C., MFR: 9.0 g/10 min
(ASTM D1238, 275° C./2.16 kg load)

(Antioxidants)

Bisphenol-based antioxidants, phosphorus-based antioxidants, and phenol-based antioxidants used were the commercial products shown in the following Table 1.

Examples are summarized in the following Tables 3 to 5. Raw materials used and the addition amounts thereof in the comparative Examples and Reference Examples are summarized in the following Tables 6 and 7. Further, results of

TABLE 1

| Stabilizer | Product name | Substance name |
|---|---|---|
| Bisphenol-based antioxidants | Sumilizer GA80 manufactured by Sumitomo Chemical | 3,9-bis[2-[3-(tert-butyl-4-hydroxy-5-methylphenyl)propionyloxy)]-1,1-dimethylethyl]-2,4,8.10-tetraoxaspiro[5,5]undecane |
| | Nolax NS-30 manufactured by Ouchi Shinko Chemical Industrial | 4,4'-butylidene bis(3-methyl-6-tert-butylphenol) |
| | Bisphenol A manufactured by Mitsubishi Chemical Corp. | 2,2'-bis(4-hydroxyphenyl)propane |
| Phosphorus-based antioxidants | Sumilizer GP manufactured by Sumitomo Chemical | 6-[3-(3-tert-butyl-4-hydroxy-5-methylphenyl)propoxy]-2,4,8,10-tetra-t-butyldibenzo[d,f][1,3,2]dioxaphosphepin |
| | Adekastab PEP-36 manufactured by ADEKA | 3,9-bis(2,6-di-tert-butyl-4-methylphenoxy)-2,4,8,10-tetraoxa-3,9-diphosphaspiro[5,5]undecane |
| | IRGAFOS168 manufactured by Toyotsu Chemiplas | tris(2,4-di-tert-butylphenyl) phosphite |
| Phenol-based antioxidant | Adekastab AO-40 manufactured by ADEKA | 4,4'-butylidene bis(6-tert-butyl-m-cresol) |

(Acid Acceptors)

Acid acceptors used in Comparative Examples are as follows:
  Acid acceptor: Kyowamag MF-150 manufactured by Kyowa Chemical Industry
  Acid acceptor: DHT-4C manufactured by Kyowa Chemical Industry
  Acid acceptor: Alcamizer P93 manufactured by Kyowa Chemical Industry Example 1

100 mass % of the ECTFE raw material "700HC" and 0.2 mass % of Sumilizer GA80 manufactured by Sumitomo Chemical were mixed previously. After the mixture was mixed under fusion at 250° C., it was extruded into the strand shape, using a 50 mm single-screw extruder (L/D: 25) equipped with a full flight screw (compression ratio: 2.3), cooled and then pelletized into uniformly mixed pellets in a pelletizer. The pellets melt-mixed was processed by the method described above, to give a sheet having a thickness of 0.25 mm.

Sheeting was performed in the manner described below:
First, the pellets prepared from ECTFE and an antioxidant by melt mixing were melt-kneaded, by using a 65 mm single screw extruder (manufactured by GM Engineering, L/D: 25) equipped with a full flight screw having a compression ratio of 2.3 under an extruder temperature setting permitting sufficient plasticization and extruded out of a coat hanger-type T die (sheet width: 1160 mm, downward extrusion type), to give a melt resin sheet.

The melt resin sheet was then withdrawn, as it was brought into contact with the crimping point (set at a position separated from the T die ejection nozzle by a straight line distance of 100 mm) between a hard chrome-plated hard roll (Ry: 0.2 s), which was controlled to a heating medium temperature of 70° C., and a silicone rubber roll (MW Mirror Roll manufactured by Mochida Corporation), cooled to normal temperature and wound on a cardboard tube, to give a resin sheet.

Examples 2 to 20, Comparative Examples 1 to 5, and Reference Examples 1 to 6

A sheet was prepared by the method of Example 1. Raw materials used and the addition amounts thereof in these sheet evaluation and also of weather resistance evaluation are summarized in the following Tables 3 to 5 and Tables 6 and 7.

<Evaluation of Sheet>
(Haze)

The transparency of a resin sheet was determined according to JIS K7105, using a haze meter "NDH7000" manufactured by Nippon Denshoku Industries Co., Ltd. and rated with the obtained haze value according to the following standard. In measurement, five samples were cut off from arbitrary positions of a resin sheet and the arithmetic mean of the hazes obtained from these samples was used. The hazes obtained were rated according to the standard shown in the following Table 2.

(Measurement of Acidic Gas Concentration)

The concentration of acidic gases at a position 10 cm above the center of the T die was determined, using a gas-detecting-tube-type gas measuring device GV-100S manufactured by GASTEC Corporation and a Kitagawa-type gas-detecting tube manufactured by Komyo Rikagaku Kogyo K.K. The observed values were rated according to the standard shown in the following Table 2.

<Evaluation of Weather Resistance>
(Test Method)

Weather resistance test of a resin sheet was carried out, using an ultra-accelerated weather meter (Metal Weather KW-R5TP manufactured by DAIPLA WINTES) under irradiation of an ultraviolet light having a wavelength of 300 to 400 nm and an intensity of 123 mW/cm$^2$, as a cycle of (i) ultraviolet light irradiation for 8 hours under a condition of a temperature of 63° C. and a relative humidity of 50% RH, (ii) showering for 20 seconds, (iii) dewing for 2 hours, and (iv) showering for 20 seconds is repeated for 200 hours. Total light transmittance and haze were determined according to JIS K7105, using a haze meter "NDH7000" manufactured by Nippon Denshoku Industries Co., Ltd. The haze values obtained was rated according to the standard shown in the following Table 2.

(Evaluation of Yellowing Index)

In evaluation of the weather resistance of the resin sheet, the yellowing index YI was determined, using Colour Cute i manufactured by Suga Test Instrument Co., Ltd. The YI values were rated according to the standard shown in the following Table 2.

(Evaluation of Image Visibility)

Evaluation of the image visibility of resin sheet was performed in the following manner: the sheet was spread in the direction vertical to horizontal direction; a paper with a red circle drawn thereon was placed at a position 1 m separated from the sheet; an examiner who stood at a position 1 m separated from the sheet in the direction opposite to the paper examined the red circle; and the visibility of the image was rated according to the standard shown in the following Table 2.

TABLE 2

|  |  | A (excellent) | B (favorable) | C (fair) | D (unfavorable) |
|---|---|---|---|---|---|
| Evaluation of sheet | HAZE | less than 3.0% | 3.0% or more and less than 5.0% | 5.0% or more and less than 10% | 10% or more |
|  | Acidic gas concentration | less than 5 ppm | 5 ppm or more and less than 10 ppm | 10 ppm or more and less than 15 ppm | 15 ppm or more |
| Evaluation of weather resistance | HAZE | less than 3.0% | 3.0% or more and less than 5.0% | 5.0% or more and less than 10% | 10% or more |
|  | YI | less than 1.5 | 1.5 or more and less than 2.0 | 2.0 or more and less than 4.0 | 4.0 or more |
| Image visibility | | The boundary line of the circle is distinct and the circle is clearly visible without change in color tone. | Although the boundary line of the circle is slightly unclear, the circle is clearly visible without change in color tone. | The boundary line of the circle is slightly unclear and there is change in color tone. | The boundary line of the circle is unclear and there is change in color tone. |

TABLE 3

|  |  | Example 1 | Example 2 | Example 3 | Example 4 | Example 5 | Example 6 |
|---|---|---|---|---|---|---|---|
| Bisphenol-based antioxidants | Compound | Sumilizer GA80 manufactured by Sumitomo Chemical | Sumilizer GA80 manufactured by Sumitomo Chemical | Sumilizer GA80 manufactured by Sumitomo Chemical | Sumilizer GA80 manufactured by Sumitomo Chemical | Nolax NS-30 manufactured by Ouchi Shinko Chemical Industrial | Nolax NS-30 manufactured by Ouchi Shinko Chemical Industrial |
|  | Addition amount (%) | 0.01 | 0.5 | 1 | 1.2 | 0.1 | 1 |
| Phosphorus-based antioxidants | Compound | — | — | — | — | — | — |
|  | Addition amount (%) | — | — | — | — | — | — |
| Acid acceptor | Compound | — | — | — | — | — | — |
|  | Addition amount (%) | — | — | — | — | — | — |
| Evaluation of sheet | HAZE (%) | 0.9 | 1.9 | 2.2 | 4.1 | 1.5 | 3 |
|  | Rating | A | A | A | B | A | B |
|  | Acidic gas concentration during sheeting | 12 | 6 | 7.5 | 5 | 13 | 9 |
|  | Rating | C | B | B | B | C | B |
| Evaluation of weather resistance | HAZE (%) | 1.2 | 1.8 | 2.6 | 5.1 | 1.9 | 3.2 |
|  | Rating | A | A | A | C | A | B |
|  | YI | 3.5 | 1.7 | 1.9 | 2.3 | 3.6 | 2.6 |
|  | Rating | C | B | B | C | C | C |
|  | Image visibility | C | B | B | C | C | B |

TABLE 4

|  |  | Example 7 | Example 8 | Example 9 | Example 10 | Example 11 | Example 12 |
|---|---|---|---|---|---|---|---|
| Bisphenol-based antioxidants | Compound | Bisphenol A manufactured by Mitsubishi Chemical Corporation | Bisphenol A manufactured by Mitsubishi Chemical Corporation | Sumilizer GA80 manufactured by Sumitomo Chemical | Sumilizer GA80 manufactured by Sumitomo Chemical | Sumilizer GA80 manufactured by Sumitomo Chemical | Sumilizer GA80 manufactured by Sumitomo Chemical |
|  | Addition amount (%) | 0.1 | 1 | 0.5 | 0.5 | 0.5 | 0.5 |
| Phosphorus-based antioxidants | Compound | — | — | Sumilizer GP manufactured by Sumitomo Chemical | Sumilizer GP manufactured by Sumitomo Chemical | Sumilizer GP manufactured by Sumitomo Chemical | Sumilizer GP manufactured by Sumitomo Chemical |
|  | Addition amount (%) | — | — | 0.01 | 0.5 | 1 | 1.2 |

TABLE 4-continued

|  |  | Example 7 | Example 8 | Example 9 | Example 10 | Example 11 | Example 12 |
|---|---|---|---|---|---|---|---|
| Acid acceptor | Compound | — | — | — | — | — | — |
|  | Addition amount (%) | — | — | — | — | — | — |
| Evaluation of sheet | HAZE (%) | 2.2 | 3.1 | 2 | 0.9 | 1 | 7.5 |
|  | Rating | A | B | A | A | A | C |
|  | Acidic gas concentration during sheeting | 9 | 8 | 6 | 3 | 2.5 | 3 |
|  | Rating | B | B | B | A | A | A |
| Evaluation of weather resistance | HAZE (%) | 2.8 | 3.6 | 2 | 1.2 | 1.5 | 10.4 |
|  | Rating | A | B | B | A | A | D |
|  | YI | 2.6 | 1.4 | 1.9 | 1.6 | 1.4 | 2 |
|  | Rating | C | B | B | B | A | C |
|  | Image visibility | B | B | B | A | A | C |

TABLE 5

|  |  | Example 13 | Example 14 | Example 15 | Example 16 |
|---|---|---|---|---|---|
| Bisphenol-based antioxidants | Compound | Nolax NS-30 manufactured by Ouchi Shinko Chemical Industrial | Bisphenol A manufactured by Mitsubishi Chemical Corporation | Sumilizer GA80 manufactured by Sumitomo Chemical | Nolax NS-30 manufactured by Ouchi Shinko Chemical Industrial |
|  | Addition amount (%) | 0.5 | 0.5 | 0.5 | 0.5 |
| Phosphorus-based antioxidants | Compound | Sumilizer GP manufactured by Sumitomo Chemical | Sumilizer GP manufactured by Sumitomo Chemical | Adekastab PEP-36 manufactured by ADEKA | Adekastab PEP-36 manufactured by ADEKA |
|  | Addition amount (%) | 0.5 | 0.5 | 0.5 | 0.5 |
| Acid acceptor | Compound | — | — | — | — |
|  | Addition amount (%) | — | — | — | — |
| Evaluation of sheet | HAZE (%) | 1.9 | 2.1 | 1 | 2.5 |
|  | Rating | A | A | A | A |
|  | Acidic gas concentration during sheeting | 2 | 3 | 12 | 4 |
|  | Rating | A | A | C | A |
| Evaluation of weather resistance | HAZE (%) | 2.4 | 1.6 | 2.3 | 3.6 |
|  | Rating | A | A | A | B |
|  | YI | 0.2 | 1.8 | 1.8 | 1 |
|  | Rating | A | B | B | A |
|  | Image visibility | A | A | B | A |

|  |  | Example 17 | Example 18 | Example 19 | Example 20 |
|---|---|---|---|---|---|
| Bisphenol-based antioxidants | Compound | Bisphenol A manufactured by Mitsubishi Chemical Corporation | Sumilizer GA80 manufactured by Sumitomo Chemical | Nolax NS-30 manufactured by Ouchi Shinko Chemical Industrial | Bisphenol A manufactured by Mitsubishi Chemical Corporation |
|  | Addition amount (%) | 0.5 | 0.5 | 0.5 | 0.5 |
| Phosphorus-based antioxidants | Compound | Adekastab PEP-36 manufactured by ADEKA | IRGAFOS168 manufactured by Toyotsu Chemiplas | IRGAFOS168 manufactured by Toyotsu Chemiplas | IRGAFOS168 manufactured by Toyotsu Chemiplas |
|  | Addition amount (%) | 0.5 | 0.5 | 0.5 | 0.5 |
| Acid acceptor | Compound | — | — | — | — |
|  | Addition amount (%) | — | — | — | — |
| Evaluation of sheet | HAZE (%) | 1.3 | 3 | 7.2 | 4 |
|  | Rating | A | B | C | B |
|  | Acidic gas concentration during sheeting | 9 | 11 | 3 | 9 |
|  | Rating | B | C | A | B |

TABLE 5-continued

| Evaluation of weather resistance | HAZE (%) | 2 | 3.5 | 7.9 | 5.2 |
|---|---|---|---|---|---|
| | Rating | A | B | C | C |
| | YI | 1.9 | 1.9 | 0.9 | 2 |
| | Rating | B | B | A | C |
| | Image visibility | B | C | B | B |

TABLE 6

| | | Comparative Example 1 | Comparative Example 2 | Comparative Example 3 | Comparative Example 4 | Comparative Example 5 |
|---|---|---|---|---|---|---|
| Bisphenol-based antioxidants | Compound | — | — | — | — | — |
| | Addition amount (%) | — | — | — | — | — |
| Phosphorus-based antioxidants | Compound | Sumilizer GP manufactured by Sumitomo Chemical | Adekastab PEP-36 manufactured by ADEKA | IRGAFOS168 manufactured by Toyotsu Chemiplas | — | — |
| | Addition amount (%) | 0.5 | 0.5 | 0.5 | — | — |
| Acid acceptor | Compound | — | — | — | — | — |
| | Addition amount (%) | — | — | — | — | — |
| Phenol-based antioxidant | Compound | — | — | — | Adekastab AO-40 manufactured by ADEKA | — |
| | Addition amount (%) | — | — | — | 0.5 | — |
| Evaluation of sheet | HAZE (%) | 6.7 | 9.7 | 7.5 | 7 | 1.5 |
| | Rating | C | C | C | B | A |
| | Acidic gas concentration during sheeting | 8 | 7.5 | 13 | 12 | 13 |
| | Rating | B | B | C | C | C |
| Evaluation of weather resistance | HAZE (%) | 12 | 8.9 | 13 | 14.5 | 40.1 |
| | Rating | D | C | D | D | D |
| | YI | 3.9 | 4.8 | 5.1 | 4.2 | 3.9 |
| | Rating | C | D | D | D | C |
| | Image visibility | D | D | D | D | D |

TABLE 7

| | | Reference Example 1 | Reference Example 2 | Reference Example 3 | Reference Example 4 | Reference Example 5 | Reference Example 6 |
|---|---|---|---|---|---|---|---|
| Bisphenol-based antioxidants | Compound | Sumilizer GA80 manufactured by Sumitomo Chemical | Nolax NS-30 manufactured by Ouchi Shinko Chemical Industrial | Bisphenol A produced by Mitsubishi Chemical Corporation | Sumilizer GA80 manufactured by Sumitomo Chemical | Nolax NS-30 manufactured by Ouchi Shinko Chemical Industrial | Bisphenol A produced by Mitsubishi Chemical Corporation |
| | Addition amount (%) | 0.2 | 0.2 | 0.2 | 0.2 | 0.2 | 0.2 |
| Phosphorus-based antioxidants | Compound | — | — | — | Sumilizer GP manufactured by Sumitomo Chemical | Adekastab PEP-36 produced by ADEKA | IRGAFOS168 produced by Toyotsu Chemiplas |
| | Addition amount (%) | — | — | — | 0.2 | 0.2 | 0.2 |
| Acid acceptor | Compound | Kyowamag [magnesium oxide] manufactured by Kyowa Chemical Industry | DHT-4A [synthetic hydrotalcite] manufactured by Kyowa Chemical Industry | Alcamizer P93 [synthetic hydrotalcite] manufactured by Kyowa Chemical Industry | Kyowamag [magnesium oxide] manufactured by Kyowa Chemical Industry | DHT-4A [synthetic hydrotalcite] manufactured by Kyowa Chemical Industry | Alcamizer P93 [synthetic hydrotalcite] manufactured by Kyowa Chemical Industry |
| | Addition amount (%) | 0.2 | 0.2 | 0.2 | 0.2 | 0.2 | 0.2 |
| Phenol-based antioxidant | Compound | — | — | — | — | — | — |
| | Addition amount (%) | — | — | — | — | — | — |

TABLE 7-continued

|  |  | Reference Example 1 | Reference Example 2 | Reference Example 3 | Reference Example 4 | Reference Example 5 | Reference Example 6 |
|---|---|---|---|---|---|---|---|
| Evaluation of sheet | HAZE (%) | 11 | 10.4 | 21.2 | 14 | 15 | 19 |
|  | Rating | D | D | D | D | D | D |
|  | Acidic gas concentration during sheeting | 0.5 | 0 | 0 | 0 | 0.5 | 0 |
|  | Rating | A | A | A | A | A | A |
| Evaluation of weather resistance | HAZE (%) | 18 | 16 | 35 | 16 | 21 | 25 |
|  | Rating | D | D | D | D | D | D |
|  | YI | 3.8 | 4.2 | 4.5 | 3.2 | 3.5 | 4.7 |
|  | Rating | C | D | D | C | C | D |
|  | Image visibility | D | D | D | D | D | D |

Results in Examples 1 to 8 demonstrate that addition of a bisphenol-based antioxidant to ECTFE was effective in giving a sheet superior in transparency, suppressing yellowing index (YI) in weather resistance evaluation and/or reducing the acidic gas concentration when the sheet is formed.

Alternately, results in Examples 9 to 20 demonstrate that addition of a bisphenol-based antioxidant and a phosphorus-based antioxidant was effective in giving a sheet superior in transparency, suppressing yellowing index in weather resistance evaluation and/or reducing the acidic gas concentration in sheet evaluation.

Three kinds of bisphenol-based antioxidants and three kinds of phosphorus-based antioxidants were used in evaluation of Examples 1 to 20 and the results thereof indicate that it is possible to obtain favorable results with various combinations.

Results in Comparative Examples 1 to 3 indicate that, although addition only of a phosphorus-based antioxidant was effective in reducing acidic gas concentration, it was not possible to suppress yellowing sufficiently, depending on the kind of the phosphorus-based antioxidant used, as shown in Comparative Examples 2 and 3.

Alternately, results in Comparative Example 4 indicate that although addition of a phenol-based antioxidant to ECTFE, replacing a bisphenol-based antioxidant, was effective in reducing acidic gas concentration, it was not possible to suppress yellowing sufficiently and the image visibility was also lower.

Yet alternately, results in Comparative in Example 5 show that addition of no bisphenol-based antioxidant, no phosphorus-based antioxidant, and no acid acceptor gave a sheet extremely unfavorable in transparency in the weather resistance evaluation and the sheet was not suited for the membrane structure according to the present invention.

Those containing a bisphenol-based antioxidant and an acid acceptor of Reference Examples 1 to 3 and those containing a bisphenol-based antioxidant, a phosphorus-based antioxidant and an acid acceptor of Reference Examples 4 to 6 were all sufficiently effective in reducing the acidic gas concentration. However, yellowing-suppressing action varied slightly, depending on the kind of the bisphenol-based antioxidant, the phosphorus-based antioxidant, or the acid acceptor used.

It was found that the resin sheet according to the present invention is superior in transparency and generates a lower concentration of acidic gases when used at high temperature. Further, the resin sheet shows superior transparency and yellowing resistance even after weather resistance test and is also superior in image visibility and thus, can be used favorably in application of membrane structures that are exposed outdoors for an extended period of time.

INDUSTRIAL APPLICABILITY

The resin composition according to the present invention can be used in applications of membrane structures and also of solar cell modules, in particular films for solar cell front or back sheets, agricultural films and others.

The invention claimed is:

1. An ethylene-chlorotrifluoroethylene copolymer resin composition having a sheet shape and comprising a bisphenol-based antioxidant, and a phosphorus-based antioxidant,
    wherein the bisphenol-based antioxidant is at least one compound selected from 3,9-bis[2-[3-(tert-butyl-4-hydroxy-5-methylphenyl)propionyloxy)]-1,1-dimethylethyl]-2,4,8,10-tetraoxaspiro[5,5]undecane, 4,4'-butylidene bis(3-methyl-6-tert-butylphenol) and 2,2'-bis(4-hydroxyphenyl)propane, and
    wherein the phosphorus-based antioxidant is contained in an amount in the range of 0.01 to 1.0 mass %.

2. The resin composition according to claim 1, wherein the bisphenol-based antioxidant is contained in an amount in the range of 0.01 to 1.0 mass %.

3. The resin composition according to claim 1, wherein the phosphorus-based antioxidant is a phosphorous ester-based antioxidant.

4. The resin composition according to claim 1, wherein the phosphorus-based antioxidant is at least one compound selected from 6-[3-(3-tert-butyl-4-hydroxy-5-methylphenyl)propoxy]-2,4,8,10-tetra-t-butyldibenzo[d,f][1,3,2]dioxaphosphepin, 3,9-bis(2,6-di-tert-butyl-4-methylphenoxy)-2,4,8,10-tetraoxa-3,9-diphosphaspiro[5,5]undecane, and tris(2,4-di-tert-butylphenyl) phosphite.

5. The resin composition according to claim 1, comprising no acid acceptor.

6. A membrane structure, comprising the resin composition according to claim 1.

7. A building comprising the resin composition according to claim 1 as a roofing material, an outer wall material, or a coating material.

8. A front sheet or a back sheet for solar cells, comprising the resin composition according to claim 1.

9. An agricultural film, comprising the resin composition according to claim 1.

10. The resin composition according to claim 1, wherein the ethylene-chlorotrifluoroethylene copolymer has a molar ratio of ethylene and chlorotrifluoroethylene, in copolymerization, of 30/70 to 70/30.

11. The resin composition according to claim 1, wherein the phosphorus-based antioxidant is 6-[3-(3-tert-butyl-4- hydroxy-5-methylphenyl)propoxy]-2,4,8,10-tetra-t-butyldibenzo[d,f][1,3,2]dioxaphosphepin to provide yellowing resistance and transparency and to reduce an amount of acidic gasses generated.

12. An ethylene-chlorotrifluoroethylene copolymer resin composition having a sheet shape and comprising a bisphenol-based antioxidant, and a phosphorus-based antioxidant,
    wherein the bisphenol-based antioxidant is at least one compound selected from 3,9-bis[2-[3-(tert-butyl-4-hydroxy-5-methylphenyl)propionyloxy)]-1,1-dimethylethyl]-2,4,8,10-tetraoxaspiro[5,5]undecane, 4,4'-butylidene bis(3-methyl-6-tert-butylphenol) and 2,2'-bis(4-hydroxyphenyl)propane, and
    wherein the phosphorus-based antioxidant is at least one compound selected from 6-[3-(3-tert-butyl-4-hydroxy-5-methylphenyl)propoxy]-2,4,8,10-tetra-t-butyldibenzo[d,f][1,3,2]-dioxaphosphepin and 3,9-bis(2,6-di-tert-butyl-4-methylphenoxy)-2,4,8,10-tetraoxa-3,9-diphosphaspiro[5,5]undecane.

13. The resin composition according to claim 12, wherein the bisphenol-based antioxidant is contained in an amount in the range of 0.01 to 1.0 mass %.

14. The resin composition according to claim 12, comprising no acid acceptor.

15. A membrane structure, comprising the resin composition according to claim 12.

16. A building comprising the resin composition according to claim 12 as a roofing material, an outer wall material, or a coating material.

17. A front sheet or a back sheet for solar cells, comprising the resin composition according to claim 12.

18. An agricultural film, comprising the resin composition according to claim 12.

19. The resin composition according to claim 12, wherein the ethylene-chlorotrifluoroethylene copolymer has a molar ratio of ethylene and chlorotrifluoroethylene, in copolymerization, of 30/70 to 70/30.

20. The resin composition according to claim 12, wherein the phosphorus-based antioxidant is 6-[3-(3-tert-butyl-4-hydroxy-5-methylphenyl)propoxy]-2,4,8,10-tetra-t-butyldibenzo[d,f][1,3,2]dioxaphosphepin to provide yellowing resistance and transparency and to reduce an amount of acidic gasses generated.

* * * * *